March 9, 1937.                C. M. BUEHN                2,073,140
                               WINDSHIELD
                          Filed Aug. 24, 1936
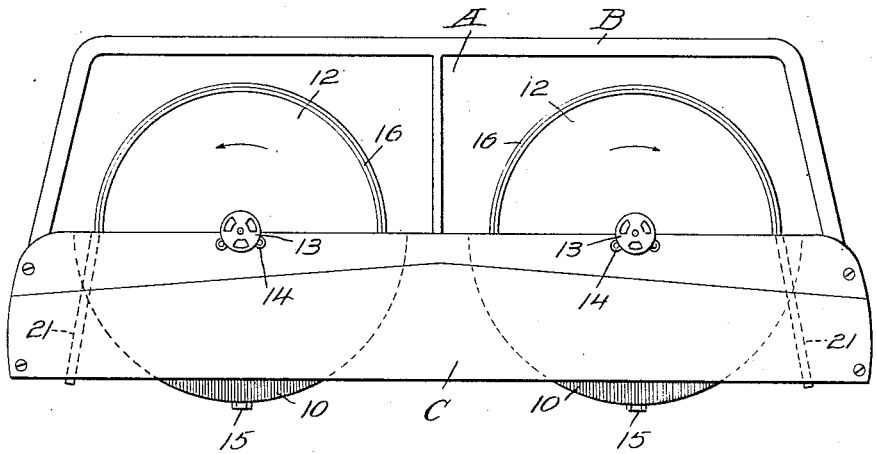
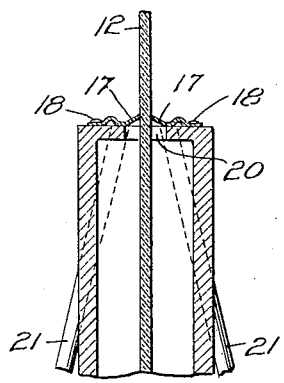 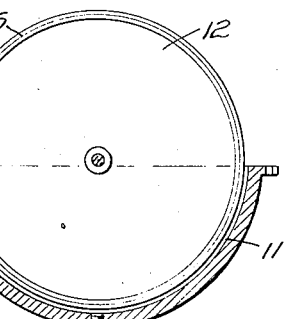 
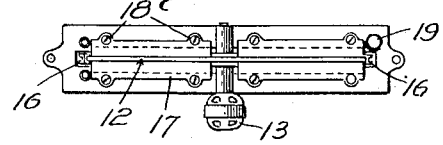
Charles M. Buehn, INVENTOR
BY Victor J. Evans & Co.
                    ATTORNEYS Patented Mar. 9, 1937

2,073,140

UNITED STATES PATENT OFFICE 2,073,140

WINDSHIELD

Charles M. Buehn, Philadelphia, Pa.

Application August 24, 1936, Serial No. 97,709

3 Claims. (Cl. 296—84)

The invention relates to a windshield and more particularly to a rotating vision disk for vehicular windshields.

The primary object of the invention is the provision of a device of this character, wherein through the use of rotatable glass disks vision can be had through a windshield during inclement weather and in association with such disks are wipers which maintain the disks clean or clear particularly from ice, sleet and rain.

Another object of the invention is the provision of a device of this character, wherein the rotating vision disks operate within wells or fonts which contain anti-freeze solution so that ice and sleet will be prevented from forming on the disks and also through associated wipers the said disks will be maintained clear and clean.

A further object of the invention is the provision of a device of this character, wherein clear vision is assured through a windshield when a vehicle is traveling at high speed and particularly during winter weather, the device being of novel construction and will eliminate the formation of ice and sleet thereon and is weather-proof.

A still further object of the invention is the provision of a device of this character, which is simple in construction, thoroughly reliable and effective in operation, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of a windshield showing the device constructed in accordance with the invention applied thereto.

Figure 2 is a vertical sectional view showing one of the rotatable disks in elevation.

Figure 3 is a top plan view of the structure shown in Figure 2.

Figure 4 is a fragmentary enlarged vertical transverse sectional view.

Figure 5 is a fragmentary perspective view of weather stripping.

Similar reference characters indicate corresponding parts throughout the several views in the drawing.

Referring to the drawing in detail, A designates generally a windshield glass which as usual is set in a frame B and the same rises from a dash or instrument board C within a vehicle, in this instance the dash or board being of special construction to accommodate spaced vertically arranged substantially half circular housings 10 preferably made of metal and each constitutes a well or font 11. Accommodated within the wells of these housings 10 are the lower halves of rotatable glass disks 12 which are of a thickness corresponding to the glass A and are accommodated at their upper halves in similarly shaped recesses provided in said glass A, these disks 12 at the centers thereof are fixed upon the power shafts of electric motors 13 so that said disks can be driven and in the driving are rotated in reverse directions to each other. The disks are spaced apart and are so disposed in the windshield to give occupants of the front seat forward vision or clear vision ahead, particularly the operator of the vehicle.

The motors 13 are made secure at 14 to the dash or board C.

Adapted to be contained within each well 11 is an anti-freeze solution (not shown), the housings 10 at the bottoms or lowermost points thereof being fitted with removable drain plugs 15 so that such solution as contained within the well can be readily discharged therefrom.

Encircling the upper half of the disk 12 at the outer periphery thereof is a substantially U-shaped weather stripping 16 which overlaps the edge of the opening or recess throughout the upper half of the said disk and also the said disk so as to render the gap therebetween weather-proof.

At opposite sides of each disk 12 and mounted at the top of the companion housing 10 therefor are stationary wipers 17 which play upon the opposite faces of the disks during rotation for the wiping thereof, these wipers being fixed in place by fasteners 18.

Each housing at its top is provided with a removable filler plug 19 for the introduction of anti-freeze solution into the well 11, the top of said housing being formed with an opening 20 for accommodating the disk 12 companion thereto.

Associated with each housing 10 are downwardly extending drain pipes 21 which discharge water from opposite faces of the disk 12 as removed therefrom by the wipers 17 during the rotation of said disk and thus exclude water from within the well 11 constituted by the housing 10.

The disk 12 when rotated travels within the anti-freeze solution contained within the wells 11 within the housings 10 so that the opposite faces of the disks will carry a very slight amount of the solution to prevent sleet coverage thereof and thus through the association of the wipers 17 a clear vision can be had through the disks. Also these wipers 17 when the anti-freeze solution is not used will assure the disks being maintained clean as by rotating the disks foreign matter collected thereon will be removed therefrom. During summer months the anti-freeze solution is not used and in substitute water can be placed within the wells 11 for the cleaning of the disks, this being effected by rotating such disks for a determined period. In winter weather the anti-freeze solution is used and there is prevented ice, sleet and rain depositing upon the disks as by the rotation thereof the wipers 17 will clean the same and through the use of the anti-freeze solution the formation of ice and sleet upon such disk will be avoided.

In the use of the disks 12 clear vision is assured through the windshield.

What is claimed is:

1. The combination with a windshield having a glass provided with half circular openings, glass disks rotatable in said openings, housings forming wells accommodating the said disks and matching the half circular openings, and motors driving the disks reversely to each other.

2. The combination with a windshield having a glass provided with half circular openings, glass disks rotatable in said openings, housings forming wells accommodating the said disks and matching the half circular openings, motors driving the disks reversely to each other, and wipers active upon opposite faces of the disks during rotation thereof and carried by the housings.

3. The combination with a windshield having a glass provided with half circular openings, glass disks rotatable in said openings, housings forming wells accommodating the said disks and matching the half circular openings, motors driving the disks reversely to each other, wipers active upon opposite faces of the disks during rotation thereof and carried by the housings, and means for draining the wells of said housings.

CHARLES M. BUEHN.